(12) United States Patent  
Michioka et al.

(10) Patent No.: US 6,398,656 B1  
(45) Date of Patent: Jun. 4, 2002

(54) UNIVERSAL JOINT

(75) Inventors: Hidekazu Michioka; Takasi Hatanaka; Tadashi Hirokawa, all of Tokyo-to (JP)

(73) Assignee: THK Co. Ltd., Tokyo (JP)

( * ) Notice: Subject to any disclaimer, the term of this patent is extended or adjusted under 35 U.S.C. 154(b) by 0 days.

(21) Appl. No.: 09/712,160

(22) Filed: Nov. 15, 2000

(30) Foreign Application Priority Data

Nov. 25, 1999 (JP) .............................. 11-334054

(51) Int. Cl.[7] .................................................. F16B 7/10
(52) U.S. Cl. ............................ 464/106; 403/52; 108/4
(58) Field of Search .......................... 464/106, 147; 108/4, 145; 248/371, 396, 398, 421; 403/52, 53, 54, 78; 384/522, 548, 551; 74/490.06

(56) References Cited

U.S. PATENT DOCUMENTS

| 289,180 | A | * | 11/1883 | Tregurtha | ................... 403/54 X |
| 3,288,421 | A | * | 11/1966 | Peterson | ........................ 108/4 X |
| 3,960,413 | A | * | 6/1976 | Abbuhl et al. | ............ 384/551 X |
| 4,607,578 | A | * | 8/1986 | Inoue et al. | ................ 108/145 |
| 4,629,185 | A | * | 12/1986 | Amann | |
| 5,036,724 | A | * | 8/1991 | Rosheim | .................. 74/490.06 |
| 5,573,218 | A | * | 11/1996 | Vaassen et al. | .............. 248/371 |
| 5,575,565 | A | | 11/1996 | Takei et al. | ..................... 384/45 |

FOREIGN PATENT DOCUMENTS

| CH | 369971 | * | 7/1963 | ................... 403/53 |
| DE | 908339 | * | 2/1954 | ....................... 108/4 |
| DE | 199 50 358 A1 | | 4/2000 | |
| FR | 768579 | * | 8/1934 | ................. 464/106 |
| GB | 1 487 935 | | 10/1977 | |

* cited by examiner

*Primary Examiner*—Greg Binda  
(74) *Attorney, Agent, or Firm*—Armstrong, Westerman & Hattori, LLP

(57) ABSTRACT

A universal joint comprises a first rotation guide member, a second rotation guide member guided by the first rotation guide means to be rotatable, and a third rotation guide member guided by the second rotation guide member to be rotatable. The first, second and third rotation guide means being operatively connected through connection members so as to provide three degrees of rotational freedom. The first, second and third rotation guide members are preferably swiveling bearings having rotational center lines, respectively, which intersect each other at one point.

5 Claims, 5 Drawing Sheets

UNIVERSAL JOINT

BACKGROUND OF THE INVENTION

The present invention relates to a universal joint to be used for, for example, a parallel link mechanism.

In prior art, there is known a parallel link mechanism in which a plurality of links are interposed between a base and an jolty table so as to allow the jolty table to perform a spatial motion.

FIG. 4 represents a driving simulation device utilizing such parallel link mechanism.

With reference to FIG. 4, a six actuators such as links 3 are disposed between the base 1 and the jolty table 2, and a jolt is imparted to the jolty table 2 by selectively expanding or contracting the respective actuators so as to control a cubic (i.e. three-dimensional) position and posture thereof. In this operation, the jolty table 2 has three degrees of freedom to determine the position thereof and three degrees of freedom to determine the posture thereof. And the jolty table has six degrees of freedom in total.

As a joint 4 interposed between both the end portions of the parallel link mechanism 3 and the base 1 or jolty table 2, there are known, as shown in FIGS. 5 and 6, a spherical bearing 5 allowing a spherical motion of the link 3 (FIG. 5) and a universal joint 6 allowing a variation of intersecting angle of the link 3 with respect to the base 1 or jolty table 2 (FIG. 6).

The spherical bearing 5 is a bearing supporting a spherical journal 7 provided for the end portion of the link 3 and has three degrees of rotational freedom, and because of this structure, the spherical bearing 5 can be smoothly operated at a time of determining the position and posture of the jolty table 2.

On the other hand, the universal joint 6 is composed of a known structure including a joint body 9 having a yoke 8, a cross fitting 10 and a bearing member disposed between the yoke 8 and the joint body 9, and such universal joint 6 has two degrees of rotational freedom.

Incidentally, in the parallel link mechanism, according to its own structure, an axial load of the link 3 is applied to the joint 4. With the spherical bearing 5 has a rigidity insufficient for supporting this axial load of the link 3. Moreover, in order to largely change the position and posture of the jolty table 2, it is necessary to make large an sway angle α of the link. However, in the spherical bearing 5, because the link 3 abuts against the bearing, it is difficult to make large this sway angle α.

On the other hand, with the universal joint 6, it is possible to make large the sway angle α of the link 3. However, because the universal joint 6 has only two degrees of rotational freedom, the number of the degree of the rotational freedom is insufficient for finely determining the position and posture of the jolty table 2, and accordingly, there may cause a case that smooth operation for determining the position and posture of the jolty table 2 cannot be expected.

SUMMARY OF THE INVENTION

An object of the present invention is to substantially eliminate defects or drawbacks encountered in the prior art mentioned above and to provide a universal joint for a parallel link mechanism capable of making smooth operation thereof, allowing a link to have a large sway angle and having a high rigidity to bear an axial load of the link.

This and other objects can be achieved according to the present invention by providing a universal joint comprising:

a first rotation guide means;

a second rotation guide means guided by the first rotation guide means to be rotatable; and a third rotation guide means guided by the second rotation guide means to be rotatable, the first, second and third rotation guide means being operatively connected so as to provide three degrees of rotational freedom.

In a preferred embodiment, the first, second and third rotation guide means have rotational center lines, respectively, which intersect each other at one point.

The third rotation guide means guides a shaft member, of a mechanism to which the universal joint is applied, intersecting the rotational center line of the third rotation guide means at an acute angle, the rotational center lines of the second and third rotation guide means intersect each other at an acute angle, and a space is formed around the rotational center line of the third rotation guide means so that the shaft is allowed to turn full circle. In such case, the mechanism may preferably be a parallel link mechanism.

At least one of the first, second and third rotation guide means comprises an outer ring having an inner peripheral surface to which a V-shaped roller rolling groove is formed, an inner ring fitted to the outer ring and having an outer peripheral surface to which a V-shaped groove roller rolling groove is formed and a number of rollers accommodated in a roller rolling passage formed in combination between the roller rolling grooves so that rotation axes of adjacent rollers are normal to each other.

Furthermore, the operative connection of these rotation guide means is performed by a first connection member connecting the first and second rotation guide means and a second connection member connecting the second and third rotation guide means. The first connection member has a bowl shape having an edge portion to which the second rotation guide means is mounted, the edge portion having an inclined surface. The second connection member has a pair of connection pieces one of which has an inclined edge portion to which one surface of the third guide means is connected and another one of which has an inclined edge portion to which another surface of the third guide means is connected.

According to the structures and characters of the present invention mentioned above, since the universal joint has three degrees of rotational freedom, for example, when the universal joint is applied to a parallel link mechanism to determine posture and position of an jolty table of the mechanism, the universal joint can be smoothly and finely operated so that the link takes an optional three-dimensional position. Further, in this embodiment, each of the respective rotation guide means has one degree of rotational freedom, and for example, ball-and-roller bearing, thrust bearing, swiveling bearing, curvilinear guide means or the like may be utilized therefor.

In the preferred embodiment, since the first, second and third rotation guide means have rotational center lines, respectively, which intersect each other at one point, the posture of such as link can be effectively changed in the three-dimensional direction about the intersecting point being the center thereof.

Furthermore, in the preferred embodiment, the shaft of the link mechanism, for example, connected to the universal joint can be rotated by 360°, and hence, the wide sway angle of the shaft member can be ensured.

Still furthermore, according to the preferred embodiment, at least one of the first, second and third rotation guide means comprises an outer ring having an inner peripheral surface to which a V-shaped roller rolling groove is formed, an inner ring fitted to the outer ring and having an outer peripheral surface to which a V-shaped roller rolling groove is formed and a number of rollers accommodated in the roller rolling passage formed by these roller rolling grooves. When such example is applied to the parallel link mechanism, a mixed load of radial load, thrust load and moment load can be supported, thus providing high rigid structure of the universal joint.

Furthermore, since rollers have rolling contact between the V-shaped roller rolling grooves, and the inner and outer rings does not have sliding contact, it is not necessary to form any play between the inner and outer rings. And friction resistance due to the rolling motion of rollers is small, so that wearing (friction), heat or the like hardly occur, thus being advantageous.

The nature and further characteristic features of the present invention will be made more clear from the following descriptions made with reference to the accompanying drawings.

DESCRIPTION OF THE PREFERRED EMBODIMENT

Figure 1:
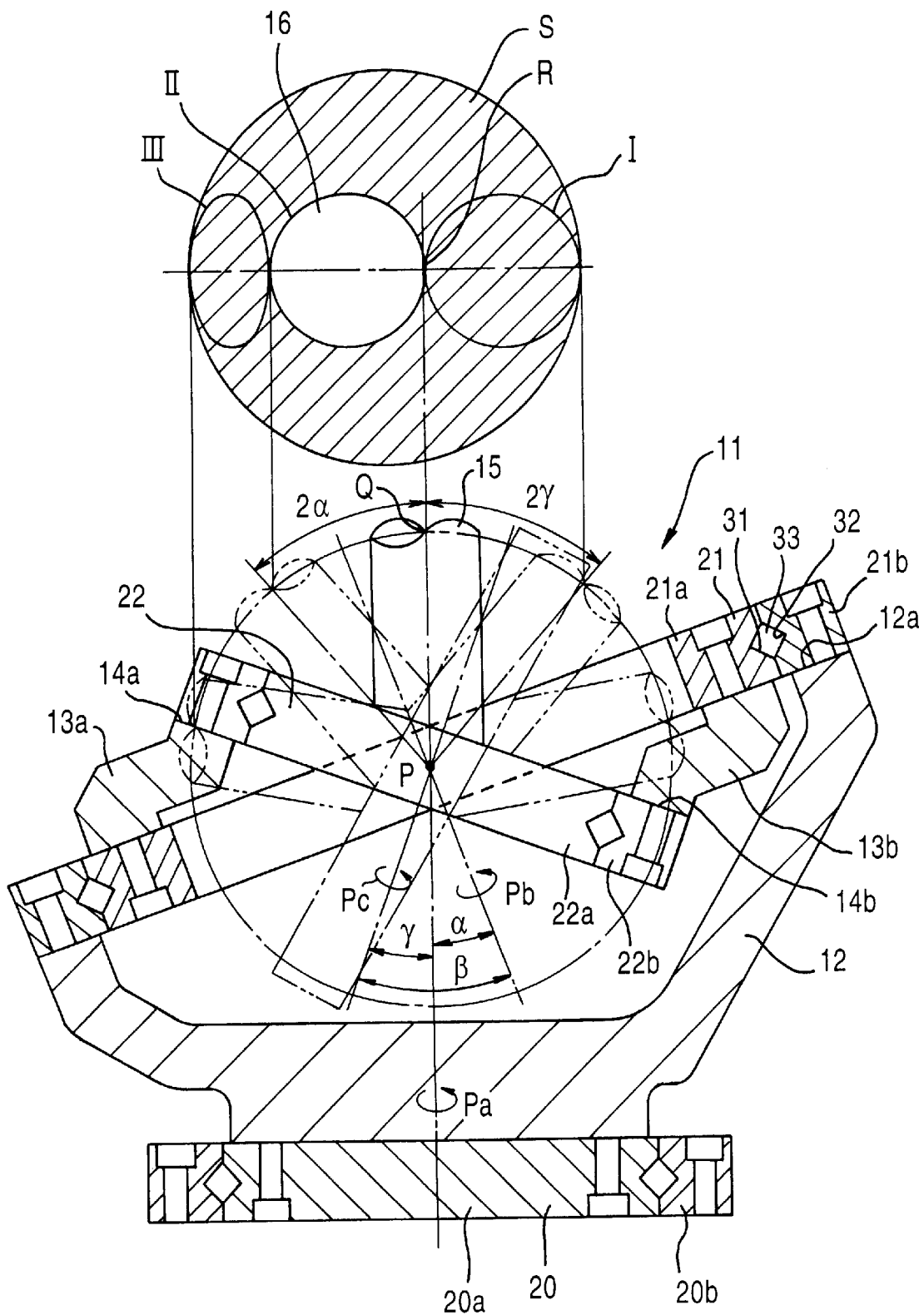
FIG. 1 is a sectional view showing a universal joint according to one embodiment of the present invention and showing an operation (motion) area of a Q point on an axis.

A preferred embodiment of the present invention will be described hereunder with reference to FIG. 1, and a universal joint 11 shown in FIG. 1 is one usable for a parallel link mechanism having a structure, for example, that a plurality of links are disposed between a base and a jolty table. And both end portions of the links are connected to the base or jolty table by universal joints 11, 11.

Figure 2:
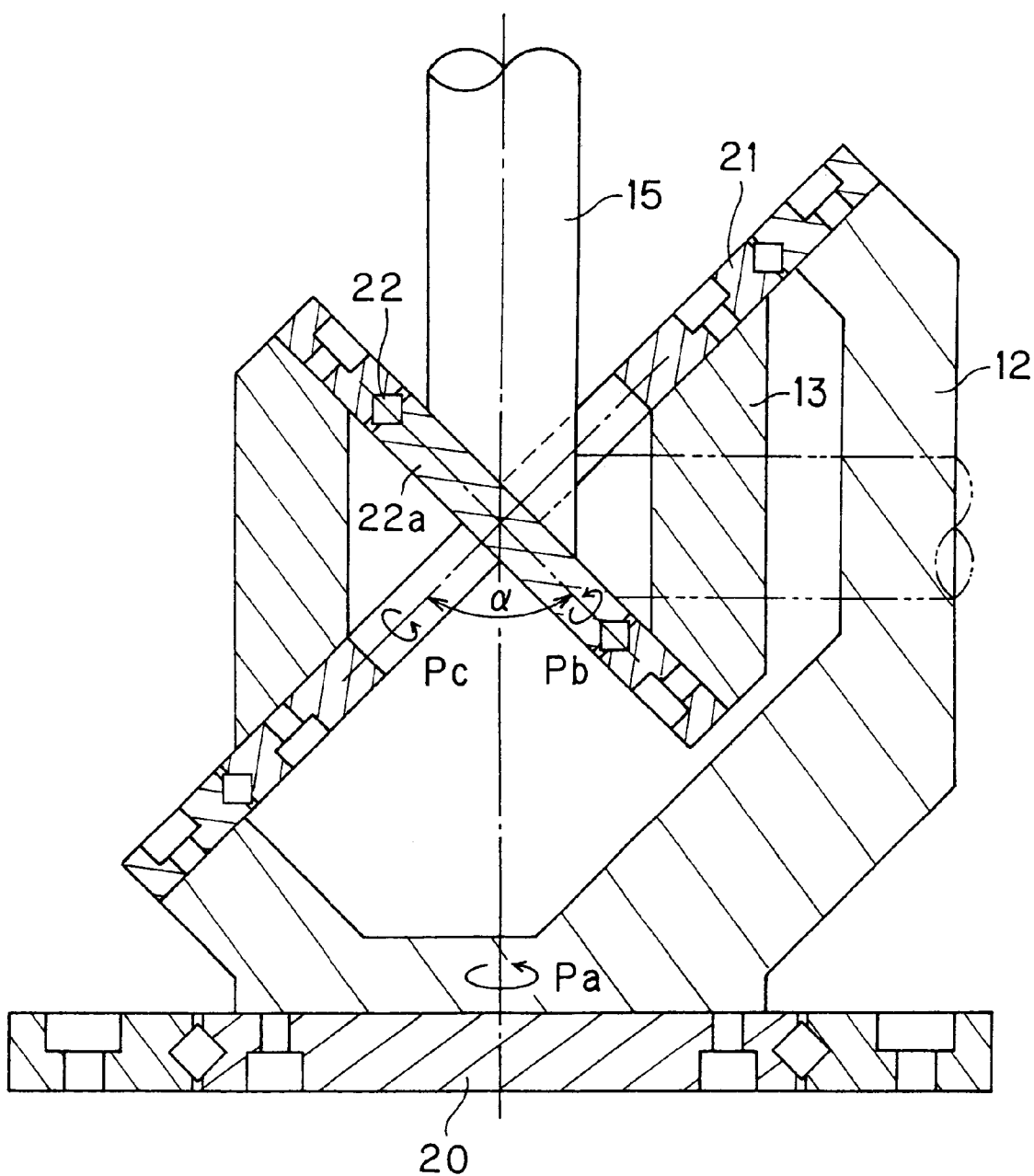
FIG. 2 shows a universal joint as a comparative example in which an intersecting angle between a Pc axis swiveling (turning) bearing and a Pb axis swiveling (turning) bearing.

With reference to FIGS. 1 and 2, the universal joint 11 is provided with a Pa axis swiveling (turning) bearing 20 as a first rotation guide means, a Pb axis swiveling (turning) bearing 21 as a second rotation guide means which is rotatably guided by the Pa axis swiveling bearing 20 and a PC axis swiveling (turning) bearing 22 as a third rotation guide means which is rotatably guided by the Pb axis swiveling bearing 21. The respective swiveling bearings 20, 21 and 22 have rotational center lines Pa, Pb and Pc, respectively, which intersect with each other at one point P. The universal joint 11 having such bearings have three degrees of rotational freedom as a whole.

The Pa axis swiveling bearing 20 has an outer ring 20b fixed, for example, to the base of the parallel link mechanism and also has an inner ring 20a performs a rotation motion inside the outer ring 20b. Structures of the other members or elements of the Pa axis swiveling bearing 20 will be described hereinlater. The inner ring 20a of the Pa axis swiveling bearing 20 is mounted with a connection member 12 which connects this inner ring 20a and an outer ring 21b of the Pb axis swiveling bearing 21. This connection member 12 has a bowl shape having an upper edge portion 12a to which an inclination is formed.

The Pb axis swiveling bearing 21 is mounted to the upper edge portion 12a of the connection member 12 so that the rotational center lines Pa and Pb intersect each other above the Pa axis swiveling bearing 20. The center P of the Pb axis swiveling bearing 21 is positioned on the rotational center line Pa of the Pa axis swiveling bearing 20. The intersecting angle α between the center lines Pa and Pb is set to an acute angle, for example 20°.

When the inner ring 20a is rotated, the Pb axis swiveling bearing 21 is rotated so that the center line Pb thereof describes a conical locus with the intersecting angle α being maintained with respect to the Pa axis swiveling bearing 20.

An inner ring 21a of the Pb axis swiveling bearing 21 is mounted with a pair of connection members 13a and 13b which connect this inner ring 21a and an outer ring 22b of the Pc axis swiveling bearing 22. One of the connection members 13a is mounted to an upper surface side of the inner ring 21a and the other one thereof 13b is mounted to a lower surface side thereof as viewed in FIG. 1. Inclinations are formed to an upper edge portion 14a of the connection member 13a and a lower edge portion 14b of the connection member 13b. The inner ring 21a has a central space so as to arrange therein the Pc axis swiveling bearing 22.

The Pc axis swiveling bearing 22 is mounted to the upper edge portion 14a of the connection member 13a and the lower edge portion 14b of the connection member 13b so that rotational centers Pb and Pc of the Pb and Pc axis swiveling bearings 21 and 22 intersect each other inside the Pb axis swiveling bearing 21. The center P of the Pc axis swiveling bearing 22 accords with the center P of the Pb axis swiveling bearing 21. An intersecting angle β between the center lines. Pc and Pb is set, for example, to be 40°. When the inner ring 21a is rotated, the Pc axis swiveling bearing 22 is rotated so that the center line Pc thereof describes a conical locus with the intersecting angle β being maintained with respect to the Pb axis swiveling bearing 21.

To an inner ring 22a of the Pc axis swiveling bearing 22, for example, is connected a shaft member 15 of such as link in the parallel link mechanism, and the shaft member 15 has a center line coincident with the center line Pa of the Pa axis swiveling bearing 20 and intersects the center line Pc of the Pc axis swiveling bearing 22 at an acute angle γ, for example 20°. When the inner ring 22a of the Pc axis swiveling bearing 22 is rotated, the shaft member 15 describes a conical locus.

As mentioned hereinbefore, the rotational center lines Pb and Pc of the Pb and Pc axis swiveling bearings 21 and 22 intersect each other at an acute angle, and a space is formed around the rotational center line Pc of the Pc axis swiveling bearing so that the shaft member 15 is rotatable by 360°.

FIG. 2 shows a comparative example of a universal joint in which an intersecting angle between the rotational center lines Pb and Pc of the Pb and Pc axis swiveling bearings 21 and 22 is set to be 90°. In the universal joint shown in FIG. 2, when the inner ring 22a of the Pc axis swiveling bearing 22 is rotated, the shaft member 15 moves from a position shown with solid line in FIG. 2 to a position shown with two-dot line and it then abuts against the connection member 12 or 13 or Pb axis swiveling bearing 21, thus being not rotated by 360°.

Figure 3:
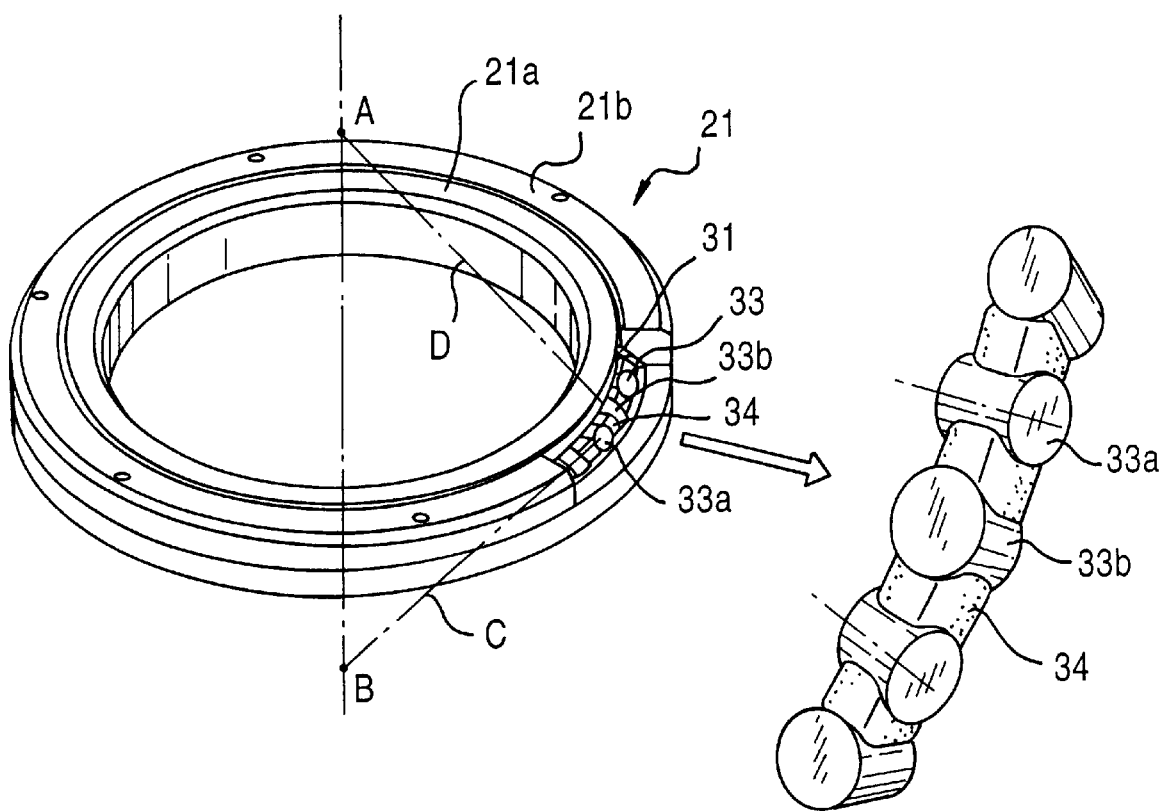
FIG. 3 is a perspective view, partially including a sectional view, showing a swiveling bearing incorporated in the universal joint mentioned above.
Figure 4:
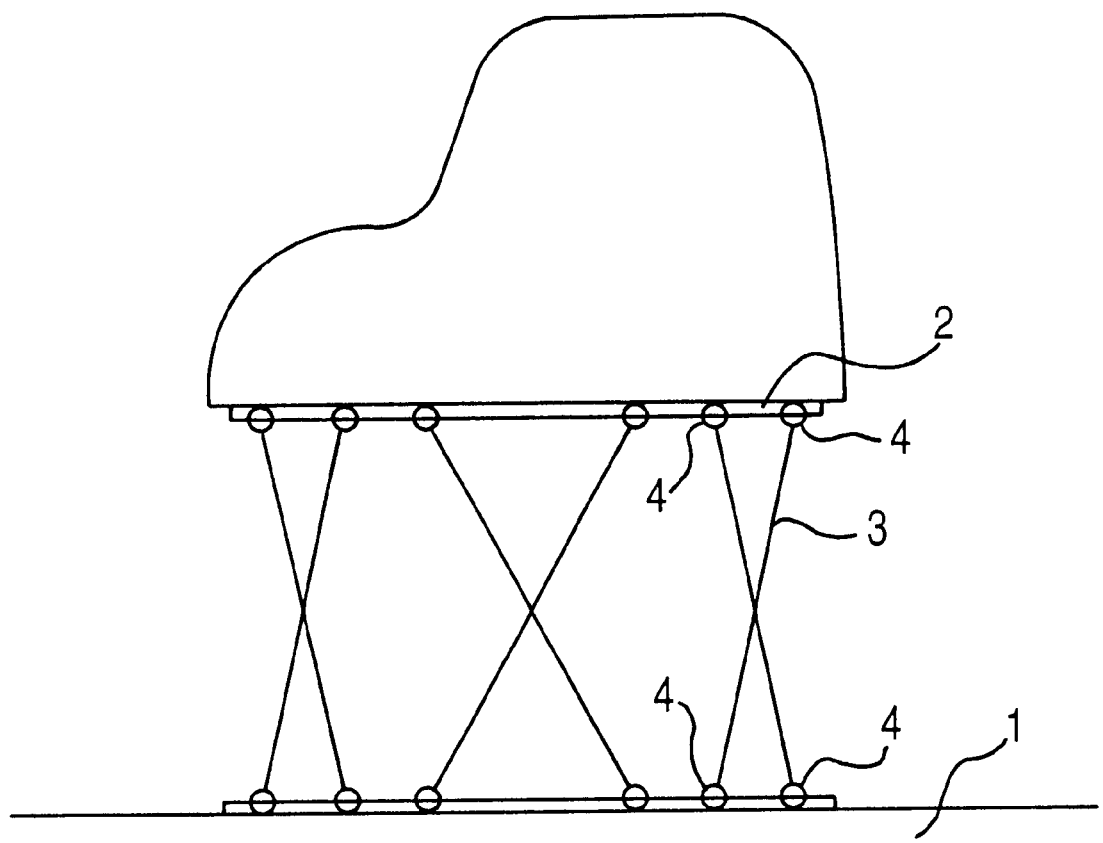
FIG. 4 is a schematic view showing parallel link mechanism.
Figure 5:
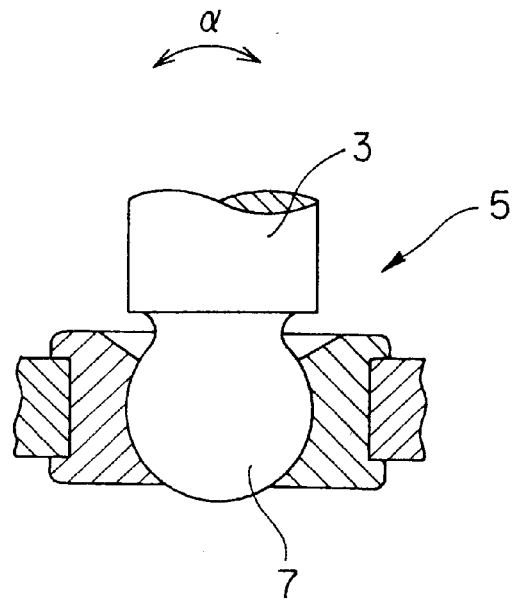
FIG. 5 is a sectional view showing one example of a conventional spherical bearing.
Figure 6:
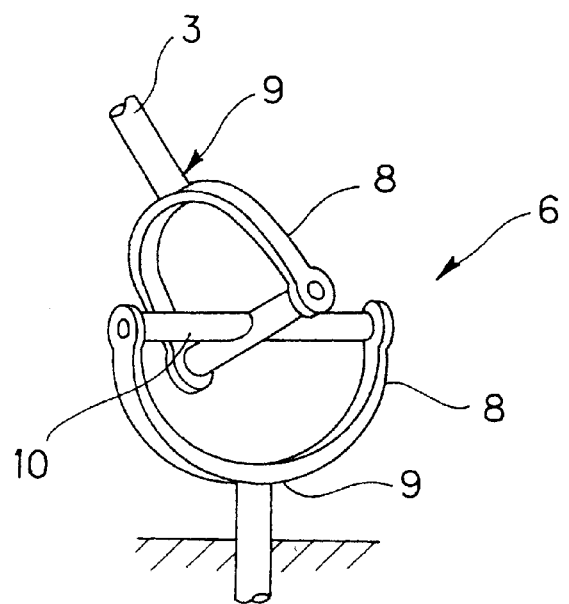
FIG. 6 is a perspective view showing another example of a conventional universal joint.

FIG. 3 shows the Pb axis swiveling bearing 21. Further, the respective swiveling bearings 20, 21 and 22 have substantially the same structures, so that the Pb axis swiveling bearing 21 is representatively explained hereunder.

The Pb axis swiveling bearing 21 is provided with an outer ring 21b formed with a roller rolling groove 32 having approximately V-shape in an opening angle 90°-section on an inner peripheral side, an inner ring 21a which is formed with a roller rolling groove 31 having approximately V-shape in an opening angle 90°-section on an outer peripheral side and which is fitted into the outer ring 21b, and a number of cylindrical rollers 33 arranged and accommodated between these roller rolling grooves 31 and 32 (see FIG. 1).

The V-shaped roller rolling grooves 31 and 32 formed respectively to the inner and outer rings 21a and 21b forms a roller rolling passage having substantially a rectangular section. The number of rollers 33 are arranged in the roller rolling passage so that the rotation axes of the adjacent ones thereof constitute a right angle (90°) Furthermore, a number of spacers 34 are disposed between the adjacent rollers 33 respectively. That is, the rollers 33 and the spacers 34 are alternately arranged in the roller rolling passage so as to hold the predetermined posture of the rollers 33. In the roller rolling passage, the rollers 33 disposed on both sides of the spacer 34 have axial lines (axes) normal to each other to thereby classify these rollers as outward roller 33a and inward roller 33b. The outward roller 33a has its axis C so that its posture is maintained to be directed to the swivel center B positioned on the rotational center line of the outer and inner rings 21b and 21a. Further, the inward roller 33b has its axis D so that its posture is maintained to be directed to the swivel center A positioned on this rotational center line. When the rollers 33a and 33b roll in the roller rolling passage with load being applied, the axes of the rollers 33a and 33b always maintain right angle with respect to the ring-shaped roller rolling passage, and hence, the rollers 33a and 33b can roll smoothly and uniformly with rolling contact and sliding contact against the outer and inner rings 21b and 21a.

In the Pb axis swiveling bearing 21, as mentioned above, the adjacent cylindrical rollers 33 are alternately arranged, so that the rotational axes thereof intersect each other at a right angle (90°), in the V-shaped (90°) roller rolling grooves 31 and 32. Accordingly, the bearing can bear all directional loads including radial load, thrust load, moment load and the like.

Next, with reference to FIG. 1, the variation (changing) of posture of the shaft member 15 due to the rotation of the respective swiveling bearings 20, 21 and 22 of the universal joint 11 will be described.

First, there will be explained a case that the inner ring 22a of the Pc axis swiveling bearing 22 is rotated. When the inner ring 22a is rotated, as mentioned above, the shaft member 15 rotates by 360° and changes its posture while describing a conical locus starting from the initial posture positioned on the Pa axis. The locus on a plane of the point Q on the center line of the shaft member 15 shows an elliptical shape I shown in FIG. 1, and as viewed from the side surface direction, the shaft member 15 is swayed by an angle of 2γ in the clockwise direction from its initial position with the point P being the center of swiveling.

In the next step, these will be explained a case that the inner ring 21a of the Pb axis swiveling bearing 21 is rotated.

When the inner ring 21a is rotated with the shaft member 15 taking its initial posture position, the shaft member 15 rotates by 360° and changes its posture while describing a conical locus starting from the initial posture positioned on the Pa axis. The locus on a plane of the point Q shows an elliptical shape II shown in FIG. 1, and as viewed from the side surface direction, the shaft member 15 is swayed by an angle of 2 α in the counter clockwise direction from its initial position with the point P being the center of swiveling. Further, under the state that the shaft member 15 is rotated by the angle of 2 α in the counter clockwise direction, when the inner ring 22a of the Pc axis swiveling bearing 22 is rotated, the locus on a plane of the point Q member 15 shows an elliptical shape III shown in FIG. 1.

Then, in a case where the Pc and Pb axis swiveling bearings 22 and 21 are simultaneously rotated, a movable operation (motion) range S of the point Q is shown with oblique lines in FIG. 1. Further, in the case where only both the Pc and Pb axis swiveling bearings 22 and 21 are rotated, there exists a blank space 16 (white portion) in the operation range S in which the point Q is not moved. However, when the Pa axis swiveling bearing Pa is also rotated, the point Q is rotated about the point R being the center of rotation, so that the blank space 16 is included in the operation range, and thus, a wide operation range can be realized. This operation range of the point Q can be optionally changed in accordance with a use condition of the universal joint 11 by changing the angles of Pa, Pb and Pc axis. Furthermore, since the shaft member 15 is swayed always about the point P, in the case of no blank space in the operation range S of the Q point, the posture of the shaft member 15 can be optionally changed in three-dimensional direction.

In the described embodiment, although the universal joint has the structure that the first to third swiveling bearings are connected through the connection members, the structure thereof is not limited to the described one and many other changes or modifications may be made. For example, there may be provided a universal joint which is composed of a conventionally known universal joint having, in order to apply two degrees of rotational freedom, a pair of joint bodies provided with yokes, a cross fitting and bearings disposed between the yokes and the cross fitting, and an additional one swiveling bearing is further arranged so as to attain three degrees of rotational freedom. That is, such universal joint comprises a pair of joint bodies having forked yokes and a cross-shaped member having shaft (shank) portions to be connected to the yokes. In this universal joint, second swiveling bearings are disposed between the yokes of one of the joint bodies and the shaft portions of the cross-shaped member. And third swiveling bearings are disposed between the yokes of the other one of the joint bodies and shaft (shank) portions intersecting the first mentioned shaft portions of the cross-shaped member. In the universal joint a first swiveling bearing is provided for either one of the paired joint bodies.

Furthermore, in the described embodiment, although the universal joint 11 is applied to the parallel link mechanism, the universal joint 11 of the present invention will be applicable to other various mechanisms without being limited to the parallel link mechanism as far as an axial load is applied to the universal joint and the mechanism requires for the universal joint to have a plurality of degrees of rotational freedom.

It is also to be noted that the present invention is not limited to the described embodiments and modified examples and many other changes and alternations may be made without departing from the scopes of the appended claims.

What is claimed is:

1. A universal joint comprising:

a first rotation guide means;

a second rotation guide means guided by the first rotation guide means to be rotatable; and a third rotation guide means guided by the second rotation guide means to be rotatable, said first, second and third rotation guide means being operatively connected so as to provide three degrees of rotational freedom;

wherein said first, second and third rotation guide means have rotational center lines, respectively, which intersect each other at one point; and wherein said third rotation guide means guides a shaft member, of a mechanism to which the universal joint is applied, intersecting the rotational center line of said third rotation guide means at an acute angle, the rotational center lines of the second and third rotation guide means intersect each other at an acute angle, and a space is formed around the rotational center line of the third rotation guide means so that said shaft is allowed to turn fall circle.

2. A universal joint according to claim 1, wherein at least one of said first, second and third rotation guide means comprises an outer ring having an inner peripheral surface to which a V-shaped roller rolling groove is formed, an inner ring fitted to said outer ring and having an outer peripheral surface to which a V-shaped groove roller rolling groove is formed and a number of rollers accommodated in a roller rolling passage formed in combination between said roller rolling grooves so that rotation axes of adjacent rollers are normal to each other.

3. A universal joint according to claim 1, further comprising a first connection member connecting said first and second rotation guide means and a second connection member connecting said second and third rotation guide means.

4. A universal joint according to claim 3, wherein said first connection member has a bowl shape having an edge portion to which said second rotation guide means is mounted, said edge portion having an inclined surface.

5. A universal joint according to claim 4, wherein said second connection member has a pair of connection pieces one of which has an inclined edge portion to which one surface of said third guide means is connected and another one of which has an inclined edge portion to which another surface of said third guide means is connected.

* * * * *